(12) United States Patent
Guay et al.

(10) Patent No.: US 7,464,781 B2
(45) Date of Patent: Dec. 16, 2008

(54) THREE-WHEELED VEHICLE HAVING A SPLIT RADIATOR AND AN INTERIOR STORAGE COMPARTMENT

(75) Inventors: Etienne Guay, Oxford (CA); Berthold Fecteau, Richmond (CA); Martin Aube, St. Bruno (CA); Bruno Girouard, Montreal (CA)

(73) Assignee: Bombardier Recreational Product Inc., Valcourt (CA)

( * ) Notice: Subject to any disclaimer, the term of this patent is extended or adjusted under 35 U.S.C. 154(b) by 360 days.

(21) Appl. No.: 10/505,335

(22) PCT Filed: Oct. 18, 2002

(86) PCT No.: PCT/CA02/01565

§ 371 (c)(1),
(2), (4) Date: May 16, 2005

(87) PCT Pub. No.: WO03/070547

PCT Pub. Date: Aug. 28, 2003

(65) Prior Publication Data

US 2005/0217909 A1 Oct. 6, 2005

Related U.S. Application Data

(60) Provisional application No. 60/358,364, filed on Feb. 22, 2002.

(51) Int. Cl.
*B62K 5/04* (2006.01)
(52) U.S. Cl. .................................. 180/68.4; 180/215

(58) Field of Classification Search ............... 180/68.4, 180/210, 211, 214, 215, 216, 217
See application file for complete search history.

(56) References Cited

U.S. PATENT DOCUMENTS

| 4,522,442 | A | | 6/1985 | Takenaka | |
|---|---|---|---|---|---|
| 4,564,081 | A | * | 1/1986 | Hamane et al. | 180/229 |
| 4,574,902 | A | * | 3/1986 | Irimajiri | 180/350 |
| 4,662,468 | A | * | 5/1987 | Ethier | 180/215 |
| 4,887,688 | A | * | 12/1989 | Horiike et al. | 180/229 |
| 5,167,294 | A | * | 12/1992 | Gessinger | 180/190 |
| 5,564,517 | A | * | 10/1996 | Levasseur | 180/185 |

(Continued)

FOREIGN PATENT DOCUMENTS

EP 1081038 3/2001

(Continued)

OTHER PUBLICATIONS

International Search Report of PCT/CA02/01565; Dec. 6, 2002; Grunfeld, M.

(Continued)

*Primary Examiner*—Christopher Ellis
*Assistant Examiner*—Bridget Avery
(74) *Attorney, Agent, or Firm*—Osler, Hoskin & Harcourt LLP

(57) ABSTRACT

A novel three-wheeled straddle type vehicle for operation by at least one rider is disclosed having a split radiator (52, 53) located on opposite sides of the vehicle frame. The location of the split radiator (52, 53) on the sides of the frame create a storage compartment in the front portion of the vehicle frame.

20 Claims, 19 Drawing Sheets

U.S. PATENT DOCUMENTS

| | | | |
|---|---|---|---|
| 5,957,230 A * | 9/1999 | Harano et al. | 180/68.4 |
| 5,992,554 A * | 11/1999 | Hasumi et al. | 180/229 |
| 6,422,182 B1 * | 7/2002 | Ohta | 123/41.29 |
| 6,446,744 B2 | 9/2002 | Wubbolts et al. | |
| 6,508,326 B2 * | 1/2003 | Kido et al. | 180/226 |

FOREIGN PATENT DOCUMENTS

| | | |
|---|---|---|
| FR | 2573024 | 5/1986 |
| JP | 62008879 | 1/1987 |
| JP | 62043384 | 2/1987 |

OTHER PUBLICATIONS

English Abstract of French application FR2573024.

* cited by examiner

US 7,464,781 B2

THREE-WHEELED VEHICLE HAVING A SPLIT RADIATOR AND AN INTERIOR STORAGE COMPARTMENT

CROSS REFERENCE TO RELATED APPLICATIONS

This application is a national phase entry of International Application Number PCT/CA02/01565, filed Oct. 18, 2002, designating the United States of America. This application is also related to and claims priority to U.S. Provisional Patent Application Ser. No. 60/358,364, which was filed on Feb. 22, 2002.

This application is also related to, but does NOT claim priority to, the following U.S. provisional applications that were filed on Feb. 22, 2002: No. 60/358,400; No. 60/358,394; No. 60/358,390; No. 60/358,395; No. 60/358,399; No. 60/358,436; No. 60/358,397; No. 60/358,439; No. 60/358,362; and No. 60/358,398. This application is also related to U.S. provisional application No. 60/358,737 filed on Feb. 25, 2002, U.S. Design Application 29/155,964 filed on Feb. 22, 2002, and U.S. Design Application 29/156,028 filed on Feb. 23, 2002. The entirety of the subject matter of these applications is incorporated by reference herein.

BACKGROUND OF THE INVENTION

1. Field of the Invention

The present invention relates to the overall design and construction of a novel three-wheeled vehicle designed for road use. Particularly, the present invention relates to a novel three-wheeled straddle-type vehicle having a split radiator associated with the engine. The split radiator includes a pair of radiators that are fluidly connected and located on opposite sides of the vehicle frame, whereby a storage compartment may be located in the front of the vehicle normally reserved for the radiator.

2. Description of Related Art

There are numerous known vehicles powered by internal combustion engines, which are designed for road use and/or off road use. All of these vehicles have special cooling parameters.

One such vehicle is an all terrain vehicle (ATV) having two front wheels, two rear wheels and a saddle type seat. The cooling system and in particular the radiator associated with the engine for an ATV is typically located in the front center of the vehicle. The radiator is also positioned fairly high on the vehicle so that the radiator is not slashed with mud. This arrangement does not permit the location of a storage compartment in the front of the vehicle. ATV's typically have a higher center of gravity compared to other vehicles. To lower the center of gravity, the radiator in the ATV may be forwardly disposed at an angle. The angle, however, must be greater than 45° so that the radiator will not contact the ground when the ATV travels down a hill.

Attempts have been made to modify an ATV to produce a straddle-type three-wheeled vehicle with two front wheels and one rear wheel. For example, U.S. Pat. No. 4,787,470 discloses a three-wheeled vehicle with two front wheels and a sole rear wheel having a body formed by an ATV frame carrying two front and one rear fenders and a saddle type seat. An engine is supported on the frame but is exposed to the exterior of the vehicle body, much like as done in motorcycles. In such a vehicle, the center of gravity of the rider and the vehicle are located higher off the ground than the vehicle contemplated by the present invention.

Another known vehicle is the motorcycle having one front wheel and one or more rear wheels. Like the ATV, the radiator for the cooling system is located in the front center of the motorcycle. With this arrangement, the motorcycle has a higher center of gravity. The location of the radiator is fixed so that it does not contact the rider and interrupt the handling of the motorcycle. This location of the radiator does not permit a forwardly located storage compartment.

Another vehicle is a snowmobile, which is designed for trail use and off-train use. The radiator associated with the cooling system for the snowmobile is located in the rear center of the snowmobile in the tunnel beneath the snowmobile. With this location, snow from the drive belt contacts the radiator to cool the engine.

Attempts have also been made to modify a snowmobile to produce a straddle-type three-wheeled vehicle. U.S. Pat. No. 4,662,468 also discloses a three-wheeled vehicle with two front wheels and a sole rear wheel. The three-wheeled vehicle of the '468 patent uses a conventional snowmobile chassis, which has been modified to attach two driving wheels at its front portion.

U.S. Pat. No. 5,564,517 discloses a snowmobile conversion frame kit which includes a frame having two wheels with a steering assembly in the front and a single wheel with a swing arm in the rear. The kit in the '517 patent is designed to be secured to a conventional snowmobile chassis also. Conventional snowmobile chassis offer less rigidity and structural strength than are required for the all-terrain vehicles. None of these vehicles provide adequate cooling for a three-wheeled vehicle having a low center of gravity as contemplated by the present invention.

OBJECTS OF THE INVENTION

It is an object of the present invention to provide a three-wheeled straddle type vehicle having two wheels in the front of the vehicle and one wheel in the rear of the vehicle.

It is another object of the present invention to provide a three-wheeled straddle type vehicle having a low center of gravity compared to conventional three wheeled vehicles.

It is another object of the present invention to provide a three-wheeled straddle type vehicle having improved maneuverability and control by comparison with conventional three wheeled vehicles.

It is another object of the present invention to provide a three-wheeled straddle type vehicle designed for road use.

It is another object of the present invention to provide a split radiator assembly that is located on opposite sides of the frame to provide an open cavity in the front of the vehicle frame for storage.

It is another object of the present invention to provide a removable storage compartment in the front of the vehicle frame that can be accessed through a removable lid in the fairing assembly.

It is another object of the present invention to provide a split radiator assembly that is positioned rearwardly of the front wheels of the three-wheeled vehicle.

It is yet another object of the present invention to provide a split radiator assembly having first and second radiators that are forwardly facing and disposed at an angle.

It is yet another objection of the present invention to provide a split radiator assembly that directs air rearwardly and below the vehicle away from the rider.

It is another object of the present invention to provide a split radiator assembly that directs air towards the centerline of the vehicle away from the rider.

It is another object of the present invention to provide access to the engine and the engine service center through the compartment in the front of the vehicle.

SUMMARY OF THE INVENTION

In response to the foregoing challenges, applicants have developed a novel three-wheeled vehicle that offers enhanced cooling while offering improved maneuverability and control with a low center of gravity. In particular, the present invention relates to a three-wheeled straddle-type vehicle having two wheels in the front of the vehicle and one wheel in the rear of the vehicle. The cooling system includes a split radiator arrangement whereby the cooling system can be located lower to the ground to improve the vehicle's center of gravity. Furthermore, the relocation of the cooling system from the front to the sides of the vehicle opens up the front portion of the vehicle for storage, which is lacking in the prior art vehicles.

A notable aspect of the three-wheeled vehicle of the present invention is that it is designed to operate with an engine capable of generating 80-135 horsepower or even greater and that it is intended for road use. Many of the three-wheeled vehicles heretofore available have been mostly capable of 30 horsepower (hp), and especially less than 100 hp, due to limitations in the structural strength of the frame and the maneuverability and stability of the vehicle. The novel head pipeless frame assembly of the three-wheeled vehicle of the present invention provides sufficient structural rigidity to withstand the forces experienced during high performance operation of the vehicle. Further, with the improved positioning of the center of gravity of the rider vis-á-vis the center of vehicle, the present invention alleviates the problems of instability and lack of control in sharp turns or during abrupt directional changes.

Applicants have developed a novel a three-wheeled straddle type vehicle for operation by at least one rider. The three-wheeled vehicle includes a frame having a front portion and a rear portion. A pair of front wheels are rotatably connected to the front portion of the frame. A single rear wheel is rotatably connected to the rear portion of the frame. The vehicle further includes a straddle type vehicle seat connected to the frame. The vehicle further includes an internal combustion engine connected to the frame. The internal combustion engine provides power to drive the pair of front wheels.

The internal combustion engine includes a radiator system for cooling the engine. In accordance with the present invention, the radiator system includes a pair of radiators. A first radiator is located on one side of the frame. A second radiator is located on an opposite side of the frame. The radiators may be operated in series or parallel. When connected in series, the pressure needed form the pump is higher because the hydraulic circuit resistance is bigger. When connected in parallel the hydraulic circuit resistance is smaller. Such a parallel arrangement, however, provides a limp home function in the event of a failure of one of the radiators. The second radiator is spaced from the first radiator. Each of the first and second radiators of the radiator are located rearwardly of the pair of front wheels. The radiators are located a sufficient distance behind the wheels so that a clearance exists between the wheels and the radiators when the wheels are turned to a maximum. The first and second radiators may be located at an angle with respect to the vertical axis and longitudinal axis of the vehicle.

The first and second radiators may be forwardly facing and disposed at an angle with respect to a vertical axis of the vehicle. It is contemplated that the first and second radiators may be disposed at angle of up to 45° with respect to the vertical axis. The first and second radiators of the radiator includes an upper portion and a lower portion. In accordance with the present invention, the upper portion may be located closer to the front portion of the frame than the lower portion.

Each radiator may include a cooling fan located on the rear surface of the radiator. The cooling fans are provided to direct air from the radiators away from the riders. The fans preferably direct the air rearwardly under the vehicle to reduce drag. This arrangement also serves to flush hot air from beneath the vehicle, which may assist in engine cooling.

The vehicle contemplated in accordance with the present invention is intended for road use. It is anticipated that these vehicles may be used during cooler seasons and in cooler climates. The radiators employed in the present invention are enclosed with covers that are located adjacent the operator's feet. It is contemplated that vents can be provided in the radiator covers to direct the air onto the feet and knees of the rider to provide a heat source. These vents may be selectively operated such that they are open when the vehicle is used in cooler environments.

It is also contemplated that the first and second radiators may be disposed at an angle with respect to the longitudinal axis or centerline of the vehicle. The first and second radiators may be disposed at angle in a range of 45° to 135° with respect to the longitudinal axis. The first and second radiators include an inner portion and an outer portion. The inner portion is located adjacent the frame assembly. In accordance with the present invention, the inner portion may be located closer to the front portion of the frame than the outer portion. It is also contemplated that the outer portion may be located closer to the front portion of the frame than the inner portion.

The vehicle further includes a fairing assembly enclosing at least the front portion of the frame. The fairing assembly includes a first radiator enclosure for enclosing at least a portion of the first radiator and a second radiator enclosure for enclosing at least a portion of the second radiator. As discussed above, the radiator enclosures may be provided with selectively operable units to direct warm air from the radiators onto the driver during cooler operating conditions. Since the vehicle is intended for road use, it is desirable to provide a storage compartment for the rider to store objects during use (e.g., a briefcase, backpack, etc.) and while not in use (e.g., a helmet). The front portion of the frame includes a cavity, which forms a storage compartment. The fairing assembly includes a removable cover to provide access to the cavity. The cavity may provide access to at least a portion of the internal combustion engine and an engine service center. The location of the radiators on the side of the vehicle increases the size of the storage area.

The vehicle further includes an air inlet passageway formed in the front portion of the frame. An oil cooler assembly is connected to the internal combustion engine for cooling engine oil circulating through the internal combustion engine. A flow of air is directed through the air inlet passageway over the oil cooler assembly to cool the oil in the oil cooler assembly. The oil cooler assembly is located between the first radiator and the second radiator. The provision of the cooling passageway permits the oil cooler to be located closer to the engine, which reduces the amount of hoses and other connections necessary to link the oil cooler to the engine. The air inlet passageway may also be used to direct a flow of air onto the radiators. In this variation, the radiators are still located on opposite sides of the vehicle, but are substantially parallel to the longitudinal axis of the vehicle. A flow director directs the flow of air from the inlet towards the radiators.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
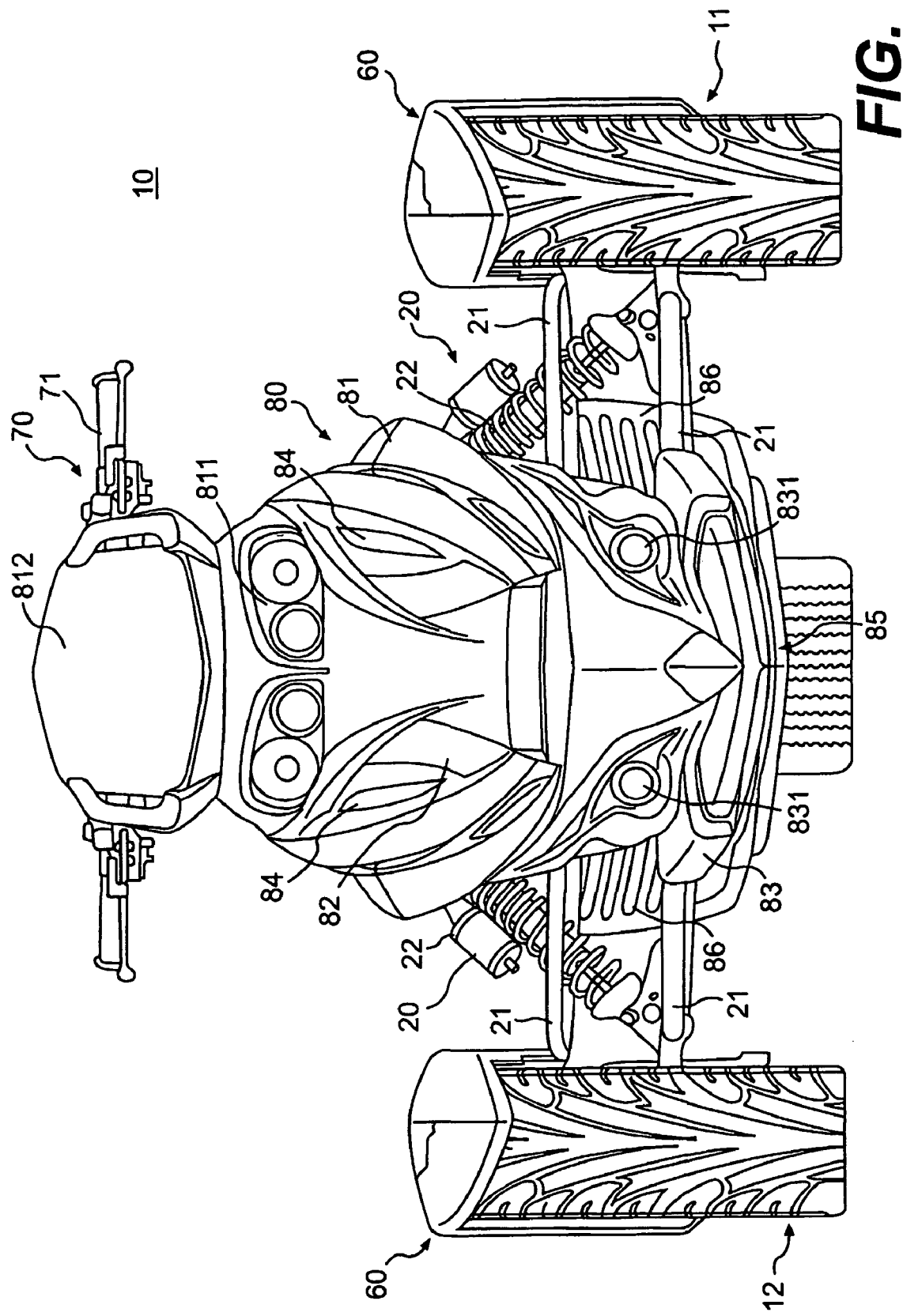
FIG. 1 is a front view of the three-wheeled straddle-type vehicle in accordance with an embodiment of the present invention.
Figure 2:
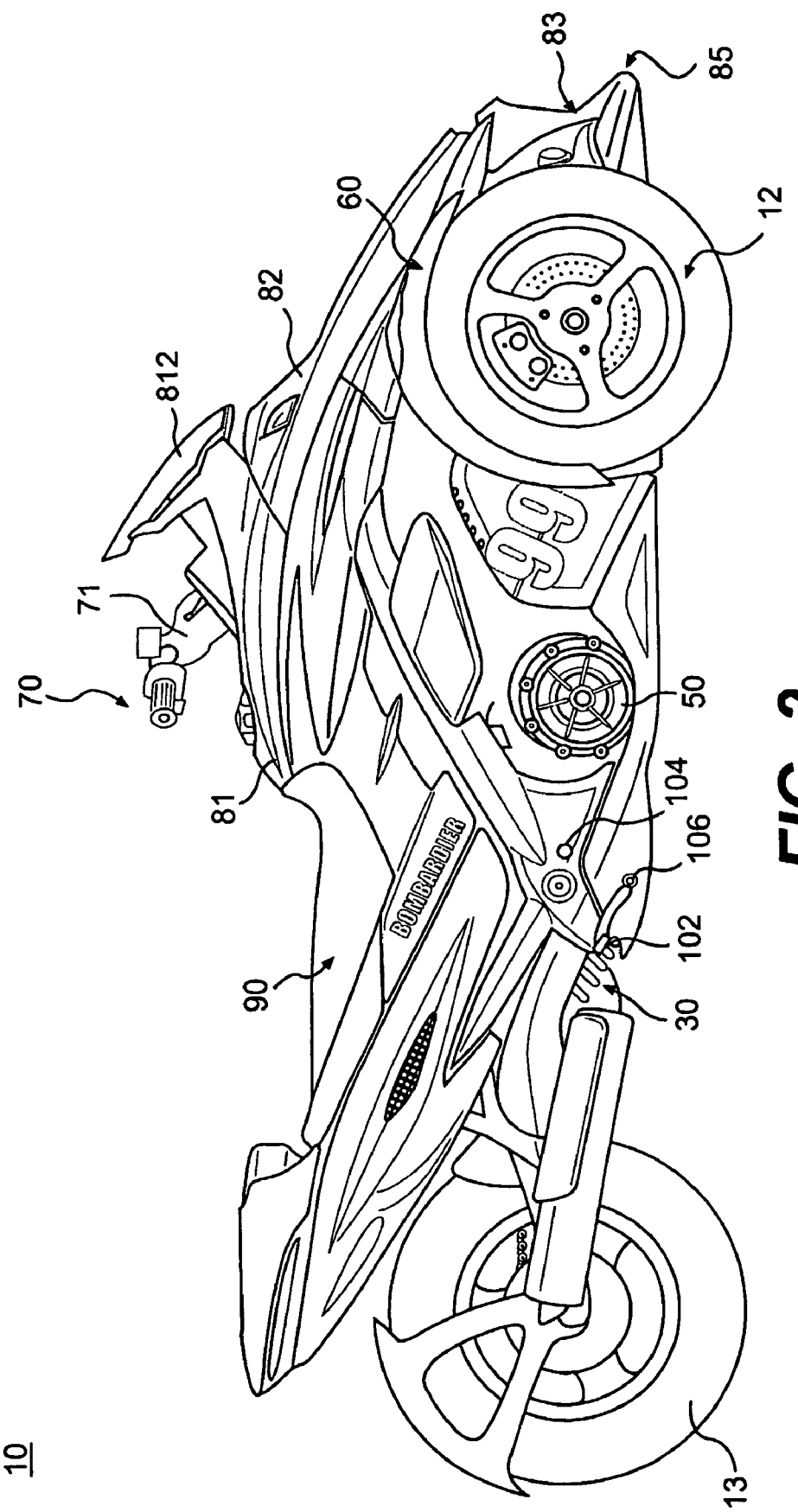
FIG. 2 is a right side view of the three-wheeled straddle-type vehicle of FIG. 1.
Figure 3:
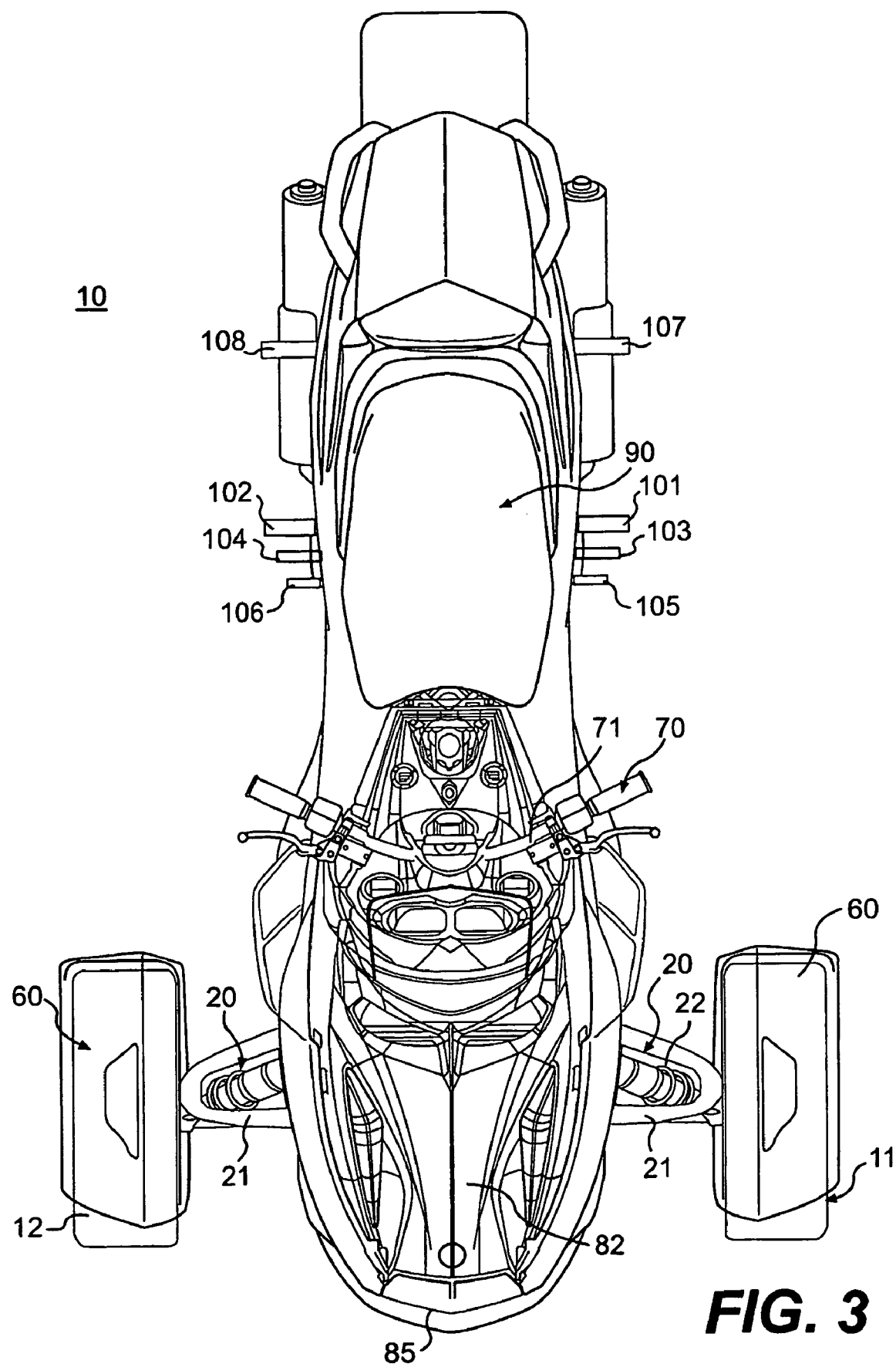
FIG. 3 is a top view of the three-wheeled straddle-type vehicle of FIG. 1.

A three-wheeled straddle type vehicle 10 in accordance with the present invention is generally illustrated in FIGS. 1-3. The vehicle 10 is designed with a straddle-type seat assembly 90 that preferably accommodates two adult-sized riders, a driver and a passenger. While the vehicle 10 is not designed to accommodate more than two adult-sized riders, the present invention contemplates that the design of vehicle 10 may be changed easily to accommodate more than two adult-sized riders.

It should be noted that the conventions "left," "right," "front," "rear," "up," and "down" are defined according to the normal, forward travel direction of the vehicle being discussed. As a result, the "left" side of a vehicle corresponds to the left side of a rider seated in a forward-facing position on the vehicle.

The vehicle 10 is designed along a longitudinal axis and includes a left front wheel 11, a right front wheel 12 and a rear wheel 13. The front wheels 11 and 12 are equally offset from the longitudinal axis, and the rear wheel is aligned with the longitudinal axis. The left and right front wheels 11 and 12 have tires secured thereto, respectively. The rear wheel 13 has a tire secure thereto. The front wheels 11 and 12 are supported by a front suspension assembly 20 and are controlled by a steering assembly 70. The rear wheel 13 is supported by a rear suspension assembly 30. The front suspension assembly 20 and the rear suspension assembly 30 are secured to a vehicle tubular frame assembly 40. The front suspension assembly 20 includes a pair of suspension support arms (A-arms) 21 and a shock absorber 22 extending from each side of the tubular frame assembly 40 to support the wheels 11 and 12. The rear suspension assembly 30 includes a swing arm that is pivotally connected to the tubular frame assembly 40 at left and right laterally-spaced rear suspension plates 41 and 42.

Figure 4:
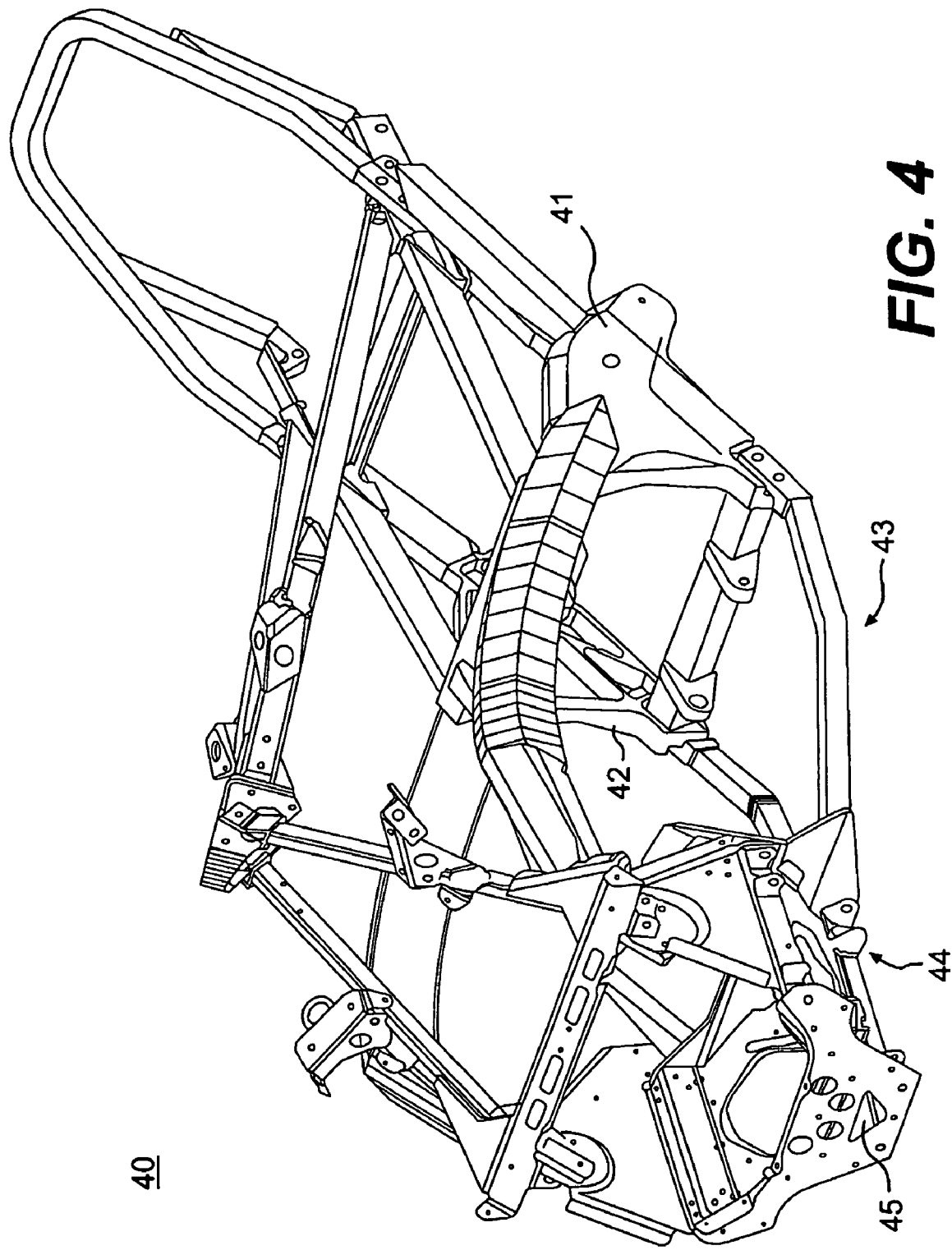
FIG. 4 is a front left perspective view of the frame assembly for the three-wheeled straddle-type vehicle of FIGS. 1-3.

An engine 50 drives the rear wheel 13 and is secured directly to the vehicle tubular frame assembly 40 adjacent to an engine cradle assembly 43, as shown in FIG. 4. Alternatively, the engine 50 may be secured to the frame assembly 40 using a suitable mounting assembly, not shown. The engine 50 is supported just behind the front suspension assembly 20 just above the bottom of the tubular frame assembly 40. This positioning provides a lower center of gravity, which is useful for ensuring good handling and stability of the vehicle 10. The tubular frame assembly 40 is discussed in greater detail in copending U.S. patent application Ser. No. 60/358,390 the disclosure of which is incorporated specifically herein by reference.

Figure 18:
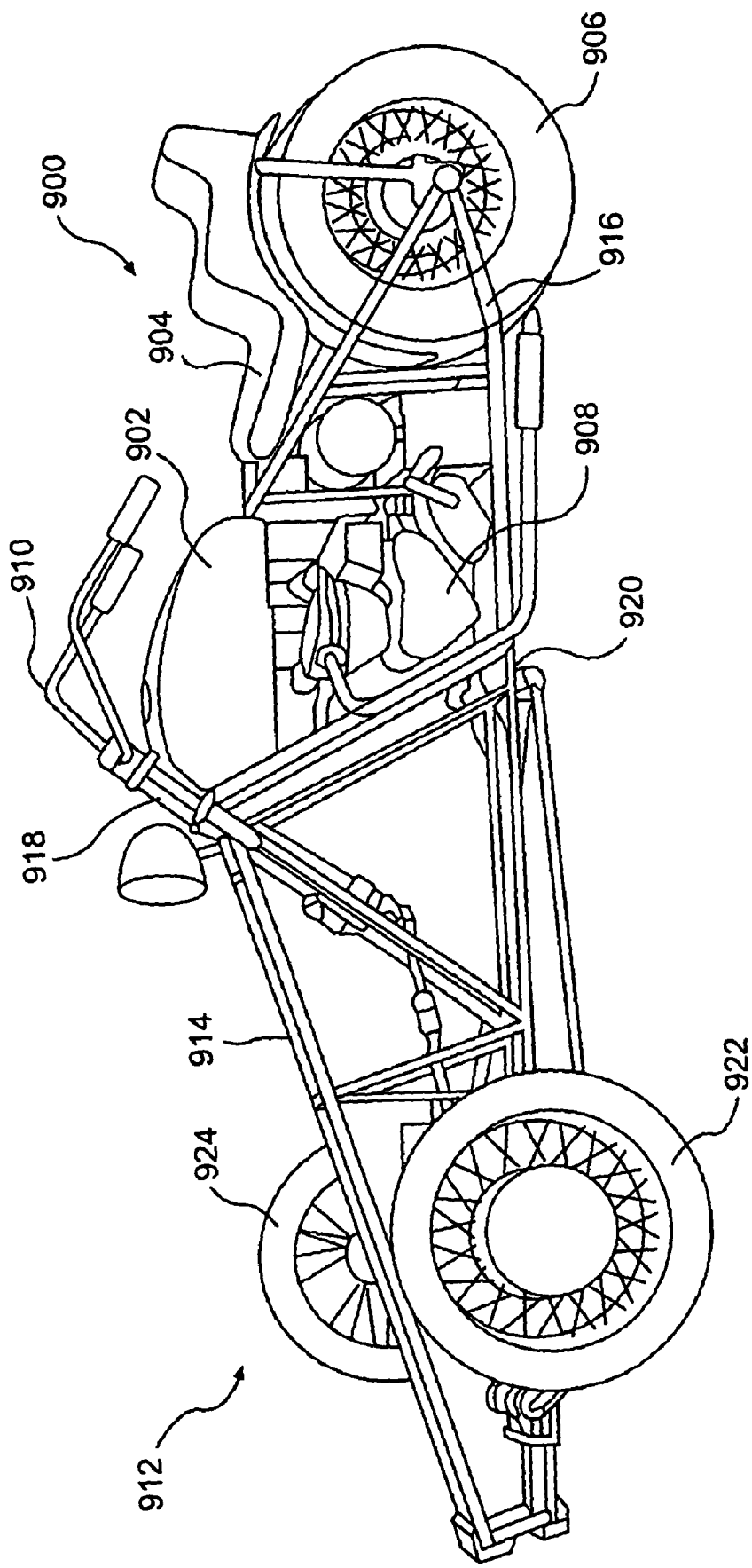
FIG. 18 is a side view of a conventional motorcycle that has been converted into a three-wheel vehicle.
Figure 19:
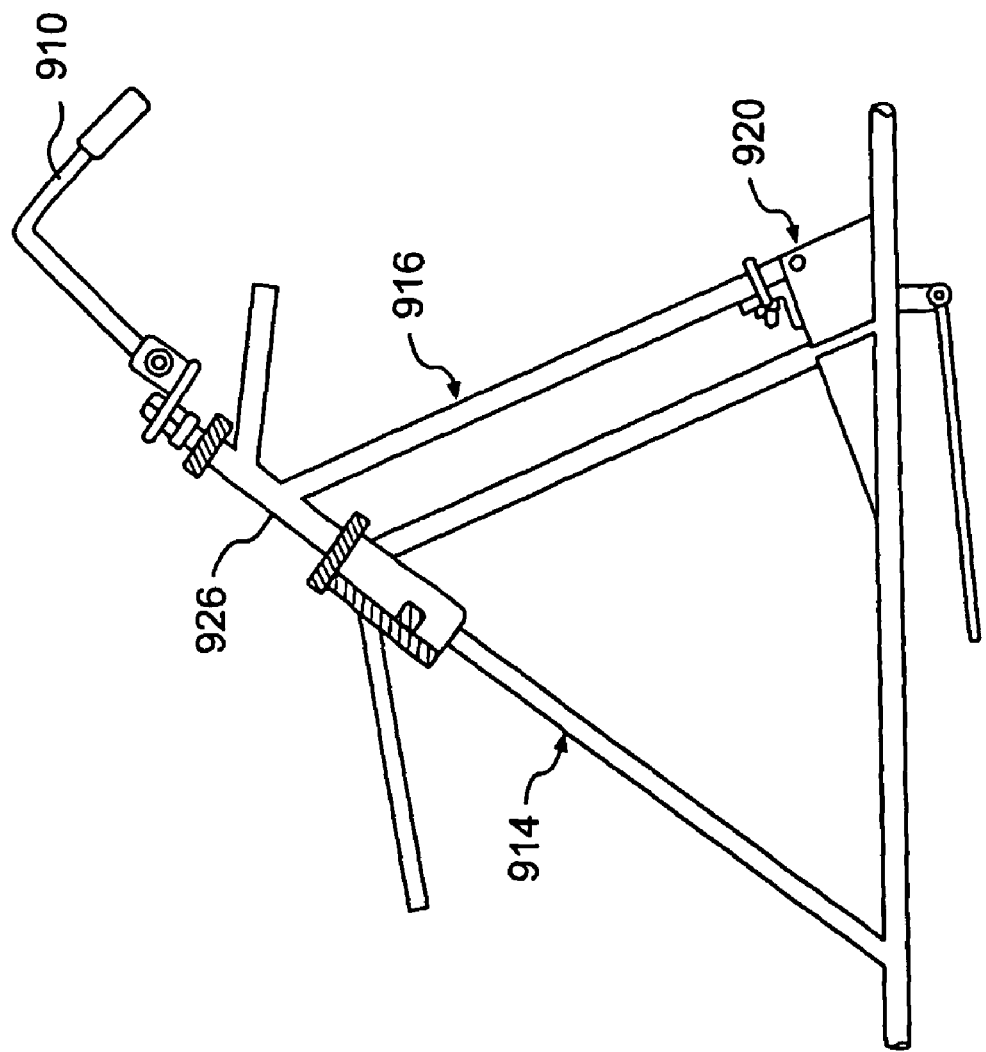
FIG. 19 is a partial side view of the conventional thee-wheel vehicle of FIG. 18.

The frame assembly 40 of the present invention may be distinguished from a motorcycle converted into a three-wheeled vehicle for at least one additional reason. FIGS. 18 and 19, which are reproduced from U.S. Pat. No. 5,326,060 are exemplary.

FIG. 18 illustrates a conventional motorcycle 900 with a fuel tank 902, seat 904, rear tire 906, engine 908, and handlebars 910. In FIG. 18, the front tire of the motorcycle 900 has been removed and replaced by a conversion kit 912.

The conversion kit 912 includes a box frame 914 made up of two tubular members in the shapes of triangles connected together via cross-members. The conversion kit 912 attaches to the frame 916 of the motorcycle 900 at the head 918 of the motorcycle 900 and also at a lower portion 920 of the frame 916. As illustrated the frame 914 of the conversion kit 912 has two tires 922, 924 suspended therefrom.

While the conversion kit 912 attaches to the frame 916 at a lower portion 920, importantly, the frame 914 also connects to the frame 916 through the head 918 of the motorcycle 900. The head 918 includes, among other components, a head pipe 926, illustrated in FIG. 19. The head pipe 926 is the cylindrical fitting, usually welded to the frame 916, through which the steering shaft of the handlebars 916 pass to steer the front wheel of the motorcycle 900. The head pipe 926, therefore, is a component of the motorcycle frame 916 that partly bears the weight of the motorcycle 900 and the rider. In other words, the head pipe 926 acts as a force focal point of the motorcycle frame 916 by bearing the entire weight of the motorcycle 900 and the rider transmitted to the front wheel. In addition, the head pipe 926 is the point through which the braking force of the motorcycle 900 is channeled. When the front brakes are applied, a portion of the weight of the motorcycle 900, a portion of the weight of the rider, and a portion of the decelerating force on the motorcycle 900 are all channeled through the head pipe 926 to the front tires 922, 924.

One way in which the frame assembly 40 of the present invention differs from the frame 916 and conversion kit 912 of the prior art is in the fact that the frame assembly 40 is not a kit 912 designed to modify a motorcycle 900 to include two front wheels 922, 924. One way to define the frame assembly 40 is to examine the basic elements that distinguish the frame assembly 40 from the frame conversion kit 912.

The frame assembly 40 differs from the conversion kit 912 by the simple fact that the frame assembly 40 is not a conversion kit. The frame assembly 40 is an entirely new frame specifically designed to withstand the forces encountered by a three-wheeled vehicle during high-performance road operation.

The frame assembly 40 also differs from the frame conversion kit 912 by the fact that the frame assembly 40 does not include a head pipe 926 or any other structure through which weight or braking forces are channeled to any other portion of the frame assembly 40. The mere fact that the frame assembly 40 does not rely on the head pipe 926 as a force focal point distinguishes the frame assembly 40 from the prior art. In addition, the fact that the frame assembly 40 does not relay on a head pipe 926 and a force focal point means that the forces acting on and generated by the vehicle 1 are more evenly distributed over the various frame components. As a result, handling characteristics for the vehicle 1 are greatly enhanced. For ease of reference, the frame assembly 40 will also be referred to as a head pipeless frame or as a frame lacking a force focal point.

The engine 50 may be an internal combustion engine. Preferably, the engine 50 is a four-stroke engine. Specifically, the engine 50 may be a 1000 cc four-stroke V-twin (V2) engine manufactured by ROTAX®. The vehicle 10 in accordance with the present invention, however, is not limited to a 1000 cc engine. It is also contemplated that a 600 cc engine may be used. Furthermore, other engine displacement sizes are considered to be well within the scope of the present invention. Moreover, while a four-stroke engine is contemplated for use on the vehicle 10, a two-stroke engine and an electric motor also may be employed. In order to simplify this application, the term engine covers every type of engine and motors.

The engine 50 includes an oil cooler assembly 51 and radiator system having a pair of spaced radiators 52 and 53 located on opposite sides of the frame assembly 40. Radiators permit liquid cooling of the engine. As discussed above, conventional engines include a radiator that is positioned in the front of the vehicle. This placement of the radiator, however, occupies valuable space in the front portion of the vehicle, which may be used to provide access to the engine and an engine service center and for storage, described in greater detail below.

The novel three-wheeled vehicle 10 of the present invention addresses and solves this problem by using a pair of radiators 52 and 53. Rather than being located in the front portion of the frame assembly 40, the first and second radiators 52 and 53 are located on opposite outer sides of the frame assembly 40, as shown in FIGS. 5, 6 and 13-15. The first and second radiators 52 and 53 are fluidly connected to each other such that they function as a single unit (i.e., the radiators 52 and 53 operate in series). With such an arrangement, a single pump (not shown) is used to pump engine coolant through both the first radiator 52 and the second radiator 53. The linked radiators require fewer operating components (e.g., a single pump instead of two pumps, fewer hose connections). Although the radiators 52 and 53 connected in series is a preferred arrangement, the present invention is not intended to be so limited. It is contemplated that the radiators may be connected in parallel (i.e., the radiators operate independently). With such an arrangement, a separate pump is used to pump coolant through each radiator. It is also contemplated that the radiators 52 and 53 can be selectively linked in series or parallel depending upon predetermined engine operating conditions.

The radiators 52 and 53 are preferably enclosed in radiator covers 86, which are formed as part of the fairing assembly 80, described below. As shown in FIGS. 1-3, the radiator covers 86 and the first and second radiators 52 and 53 are located rearwardly of the pair of front wheels 11 and 12. The radiators 52 and 53 are sufficiently spaced from the fender assemblies 60 such that the fender assemblies 60 do not contact radiators 52 and 53 when the wheels 11 and 12 are located in their maximum turning position. Numerous orientations are considered to be well within the realm of the present invention.

Figure 6:
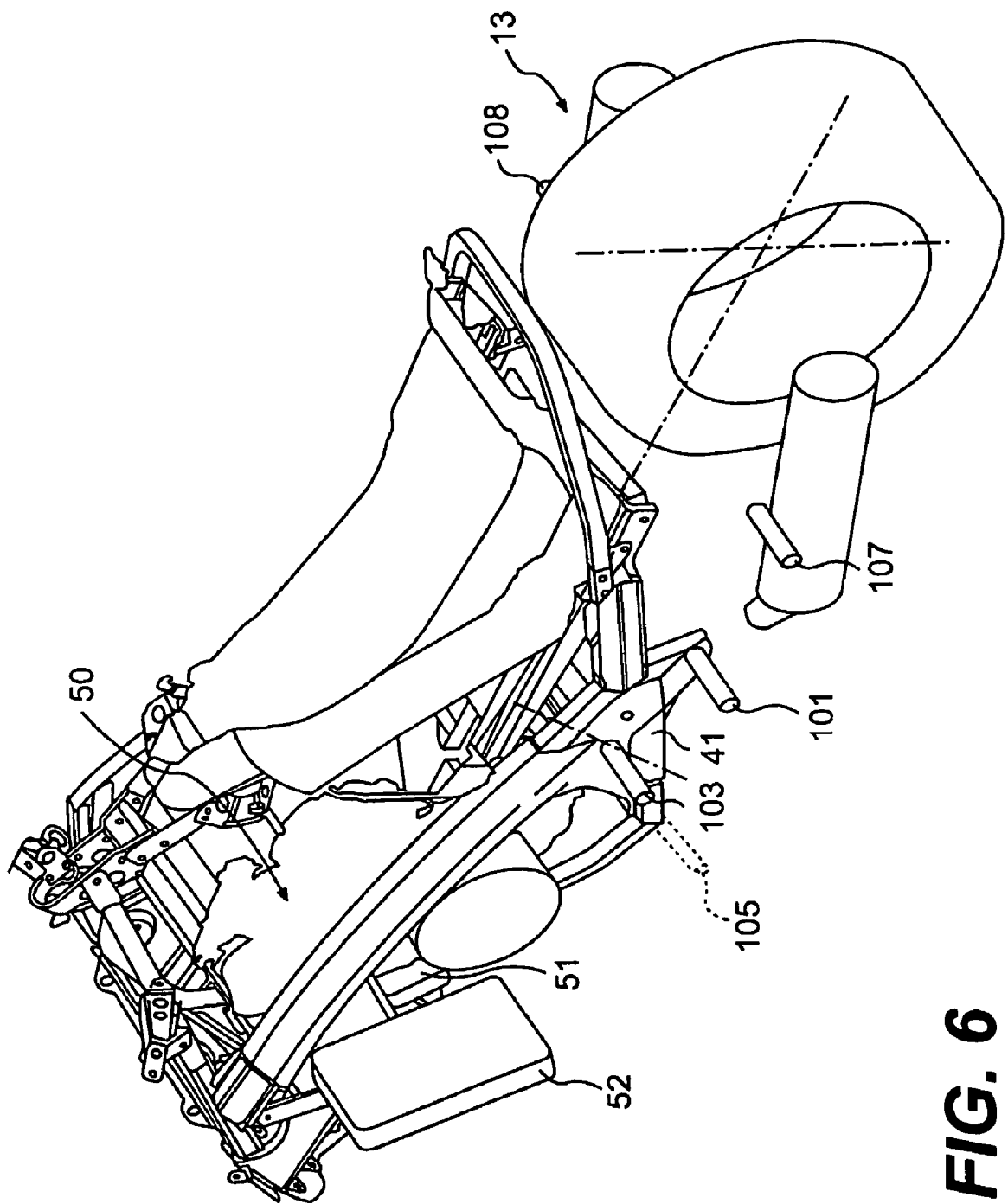
FIG. 6 is a partial left rear schematic side view of the vehicle illustrating the split radiator and cooling assembly.
Figure 7:
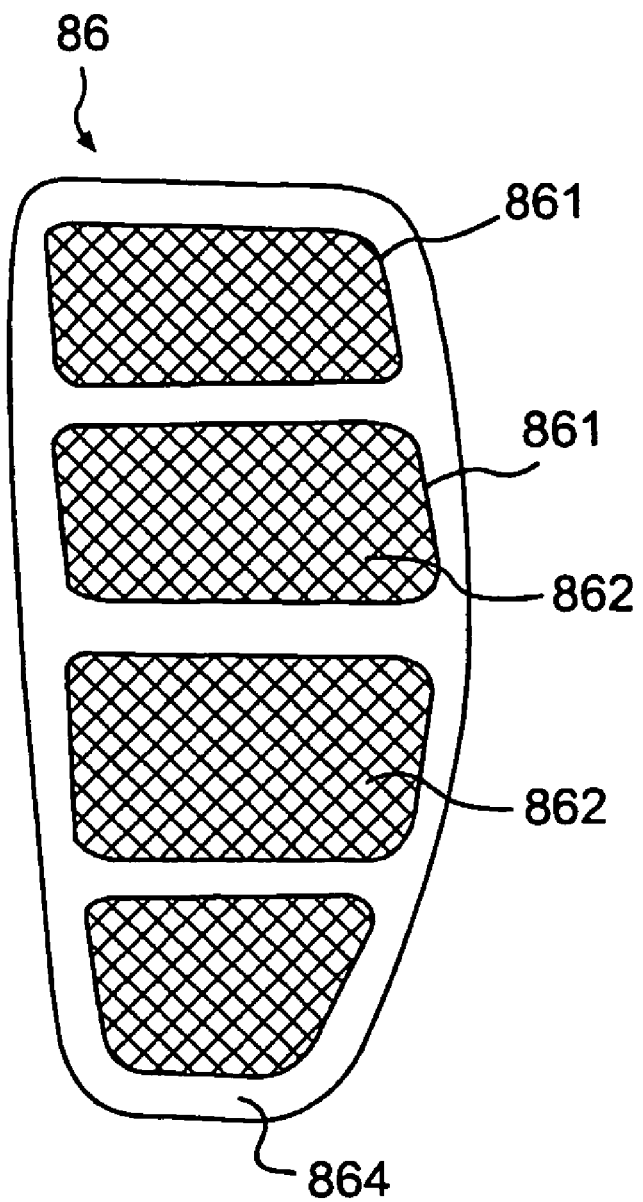
FIG. 7 is a front view of the radiator cover of the fairing assembly.
Figure 10:
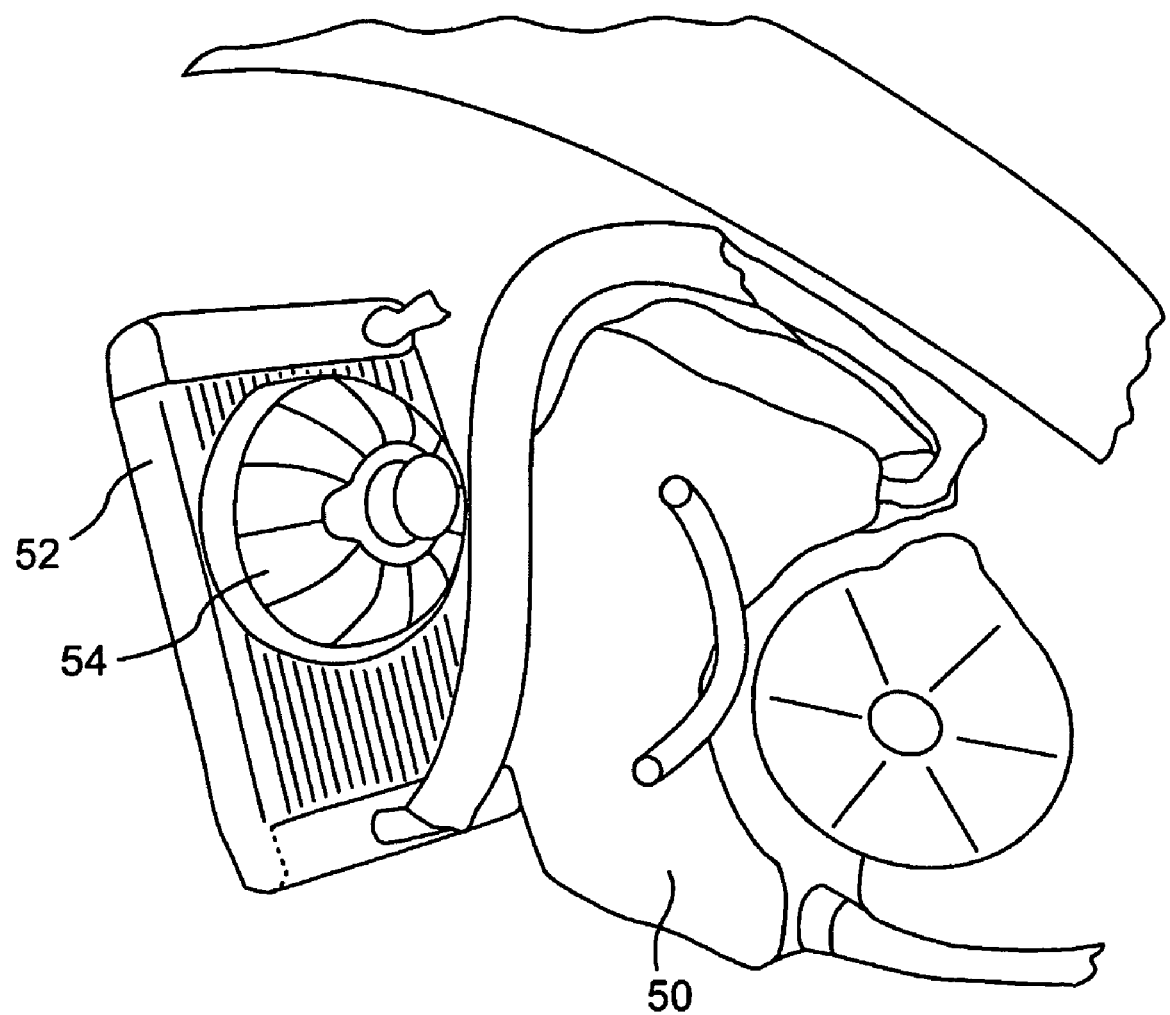
FIG. 10 is a rear perspective view of one radiator of the split radiator in accordance with the present invention.

As seen in FIGS. 6, 7 and 10, the radiators are forwardly facing. In the embodiment illustrated, they are disposed at an angle with respect to a vertical axis of the vehicle. The radiators 52 and 53 may be disposed at an angle up 45° with respect to the vertical axis of the vehicle. Angles great than 45° are also contemplated. The first and second radiators 52 and 53 include an upper portion and a lower portion. As seen in FIGS. 6 and 7, the upper portion of each radiator is located closer to the front portion of the frame assembly 40 than the lower portion. The present invention, however, is not limited to forwardly inclined radiators; rather, it is contemplated that the radiators may be substantially parallel to the vertical axis or rearwardly inclined.

Figure 13:
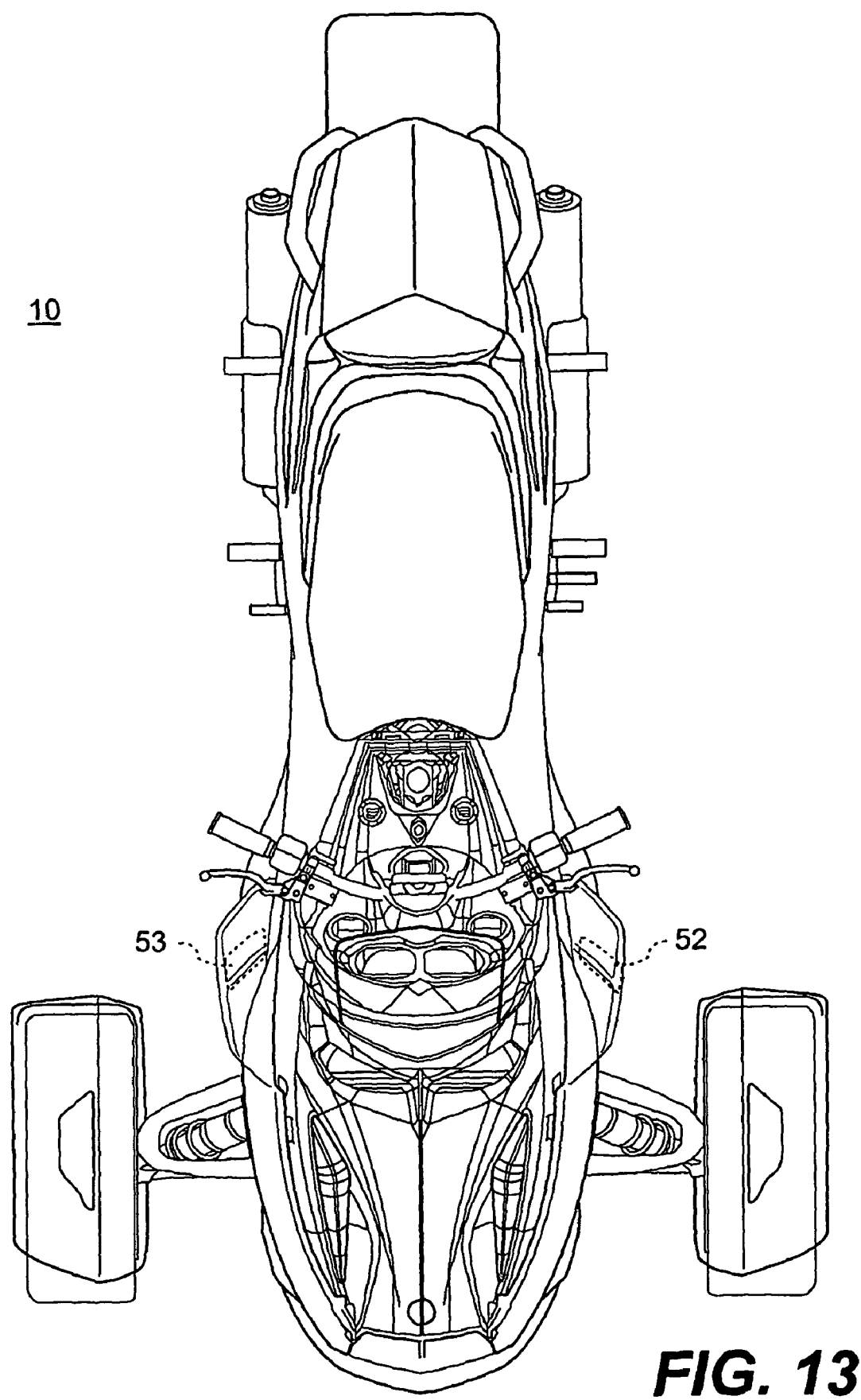
FIG. 13 is a top schematic view illustrating one orientation of the first and second radiators, shown in phantom, disposed at an angle with respect to the longitudinal axis of the vehicle.
Figure 14:
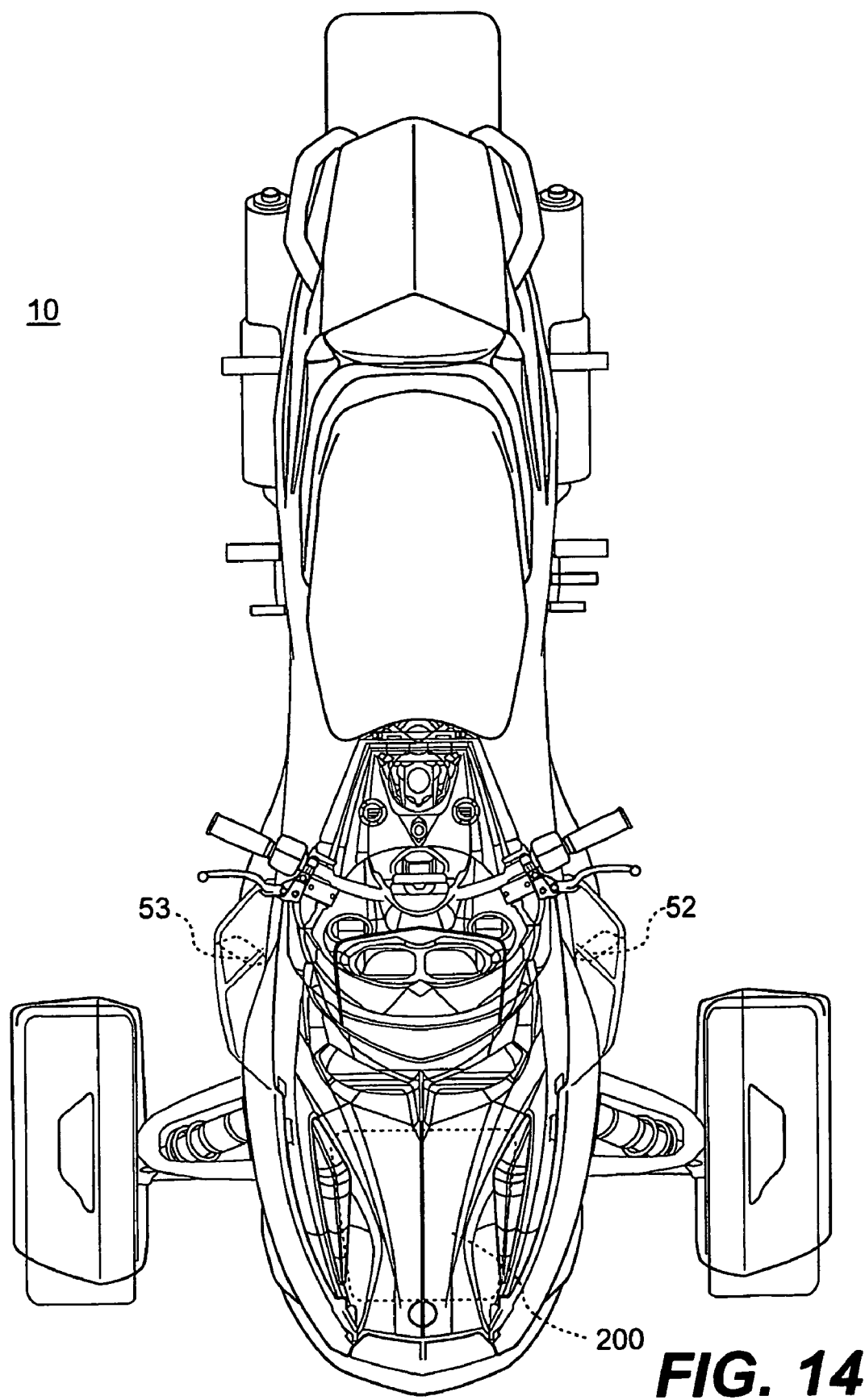
FIG. 14 is a top schematic view illustrating another orientation of the first and second radiators, shown in phantom, disposed at an angle with respect to the longitudinal axis of the vehicle.
Figure 15:
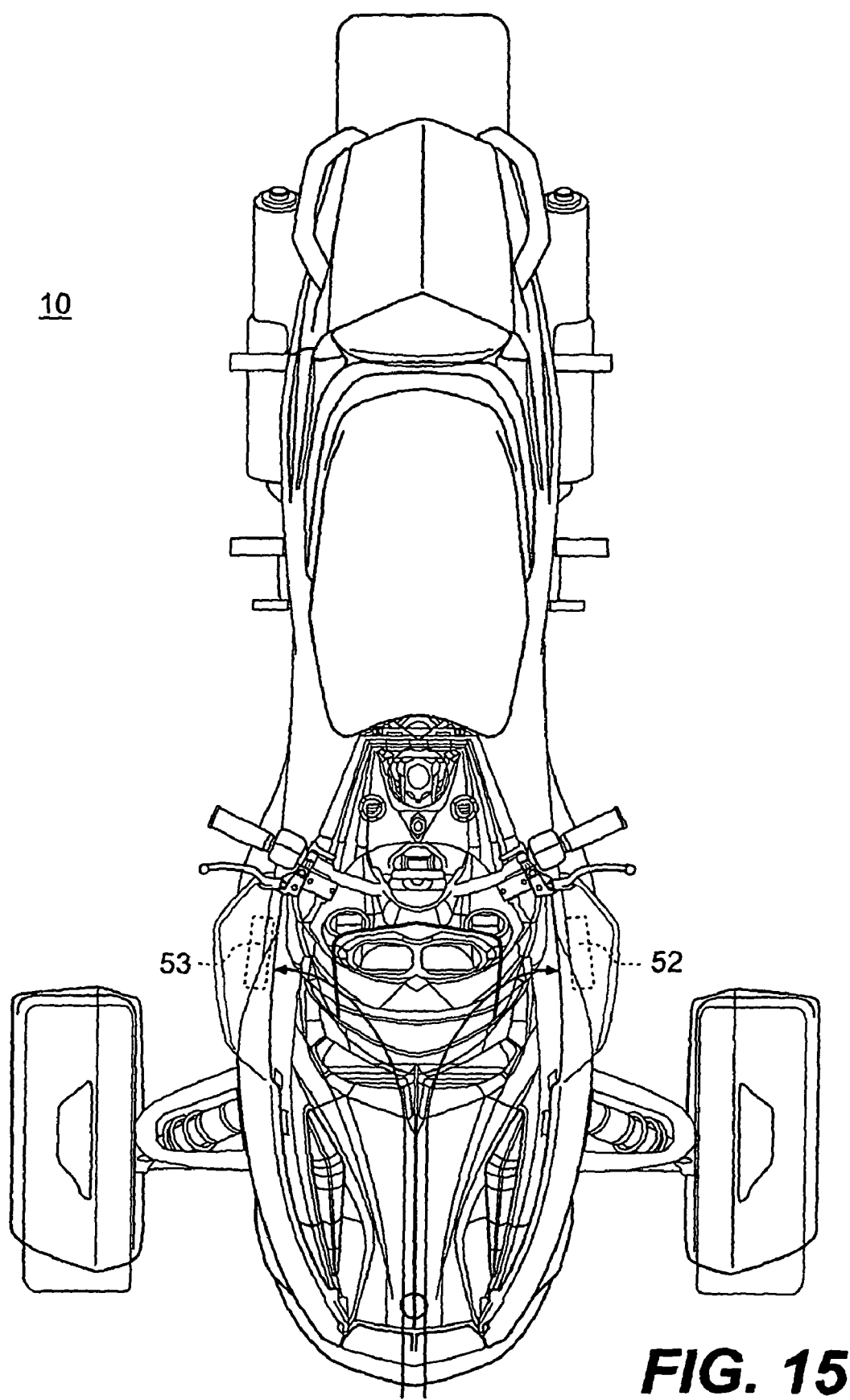
FIG. 15 is a top schematic view illustrating another orientation of the first and second radiators, shown in phantom, parallel to the longitudinal axis of the vehicle.

It is also contemplated that the first and second radiators 52 and 53 may be disposed at an angle with respect to the longitudinal axis of the vehicle 10. The first and second radiators 52 of the radiator include an inner portion and an outer portion. The inner portion is located adjacent the frame assembly 40. In accordance with the present invention, the inner portion may be located closer to or further from the front portion of the frame assembly 40 than the outer portion. The angle of orientation of the first and second radiators 52 and 53 with respect to longitudinal or centerline axis of the vehicle 10 may vary. Numerous orientations are considered to be well within the scope of the present invention. As shown in FIGS. 6, 7 and 10, the first and second radiators 52 and 53 may be arranged substantially orthogonal to the longitudinal axis. The radiators 52 and 53 may be located substantially parallel to the longitudinal axis, as shown in FIG. 15. It is contemplated that the first and second radiators 52 and 53 may be disposed at angle in the range of 45° to 135° with respect to the longitudinal axis of the vehicle 10, as shown in FIGS. 13 and 14.

Cooling may be additionally aided by an automatic fan 54 installed behind each radiator 52 and 53, as shown in FIG. 10. The fans also serve to direct hot air away from the rider when desired. The fans direct the hot air from the radiators 52 and 53 rearwardly under the vehicle, which serves to flush hot air from beneath the engine and assist with engine cooling.

Figure 16:
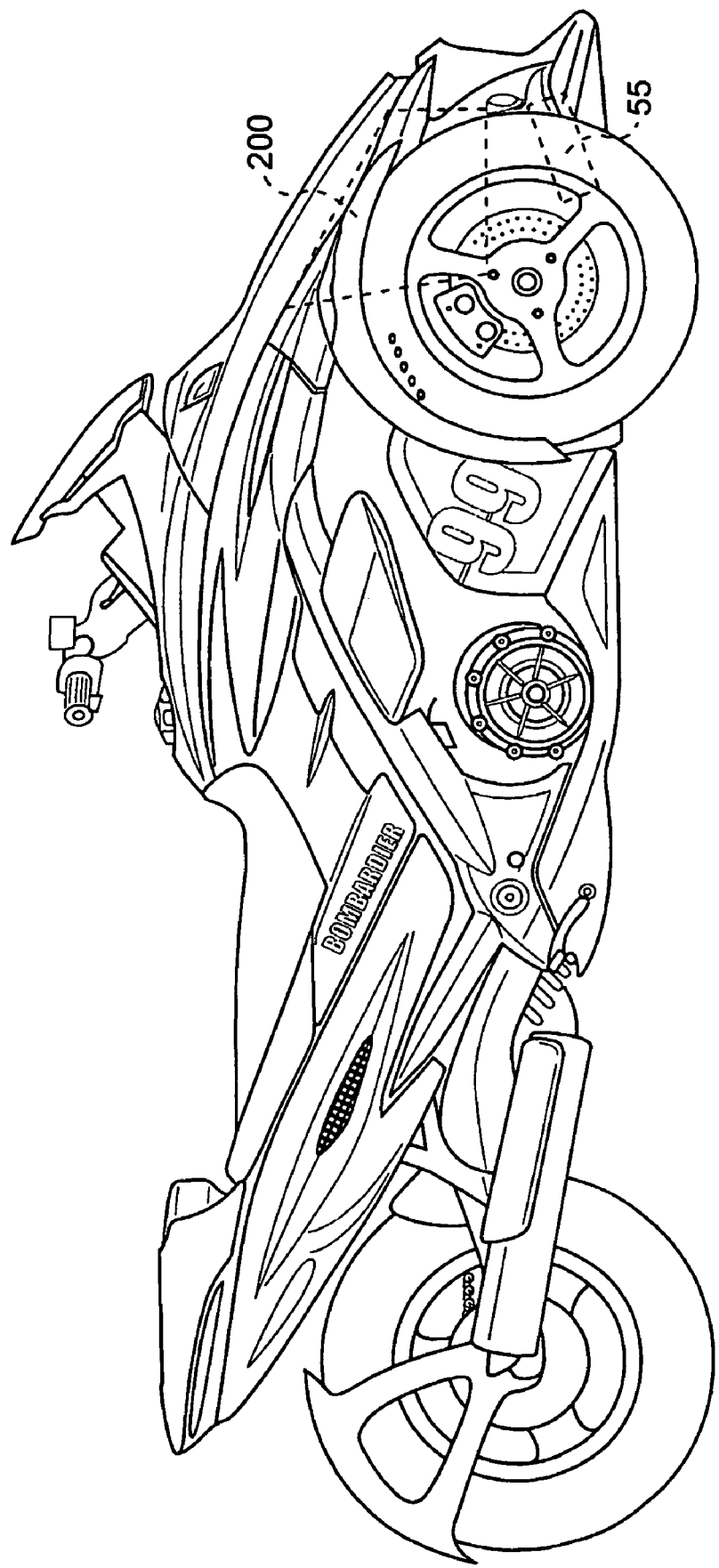
FIG. 16 is a top schematic view illustrating another orientation of a single radiator, shown in phantom, located in the front of the wheel.
Figure 17:
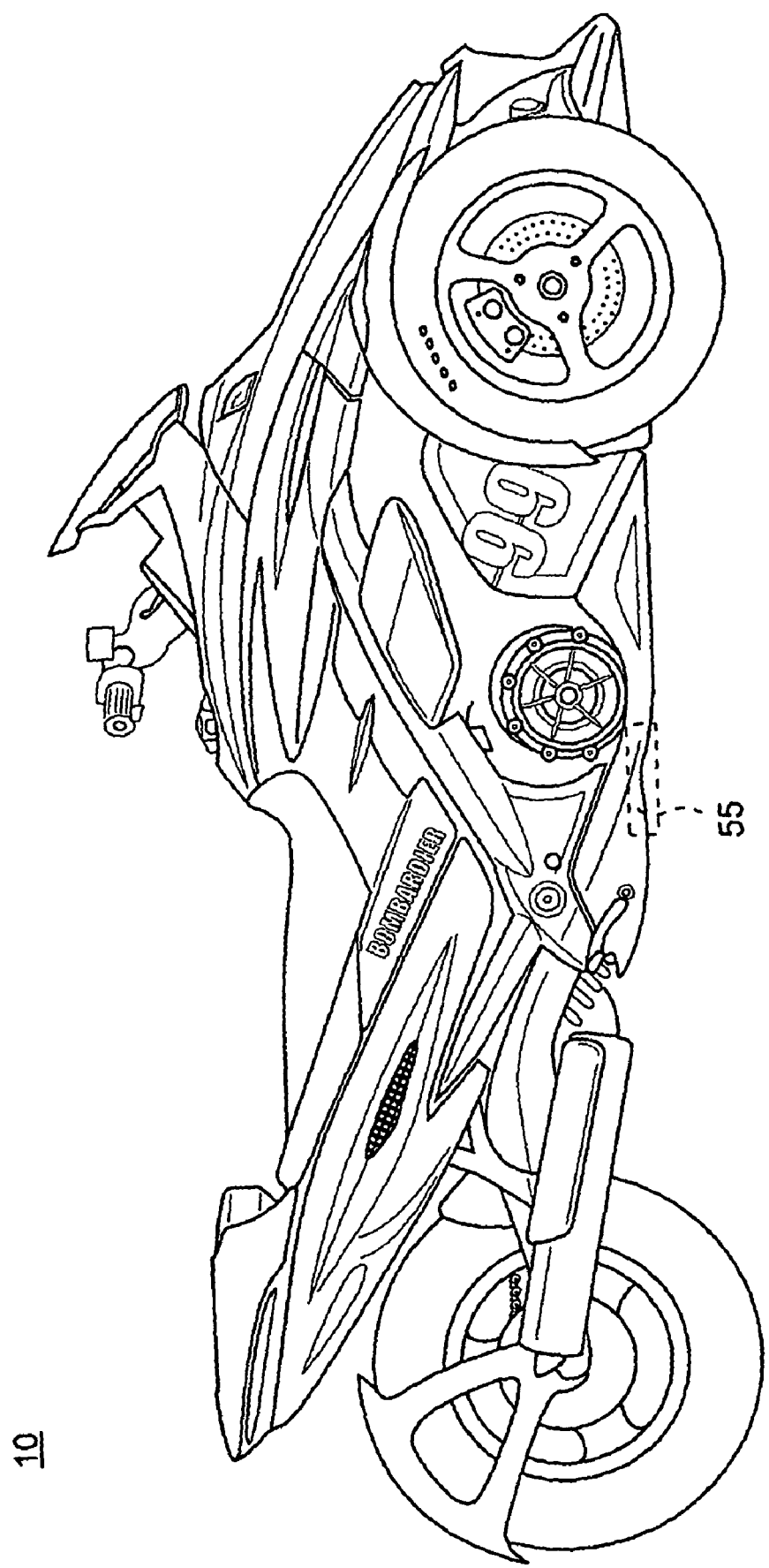
FIG. 17 is a top schematic view illustrating another orientation of a single radiator, shown in phantom, located in the rear of the vehicle.

While the preferred location of the radiators 52 and 53 is on the sides of the vehicle 10, the present invention is not limited to this arrangement. It is possible that the radiators 52 and 53 may be combined into a single radiator 55. The radiator 55 may be inclined at an angle in the front of the wheel 10, as shown in FIG. 16. Although this location may reduce the size of the storage compartment, the present invention is an improvement over the prior art because the radiator 55 has an angled orientation in the lower portion of the vehicle, which permits the location of the storage compartment above. The radiator 55 may also be located under the vehicle 10 at the rear, as shown in FIG. 17. It is also contemplated that the radiator 55 could be secured to the rear suspension 30 under the seat 90.

Figure 5:
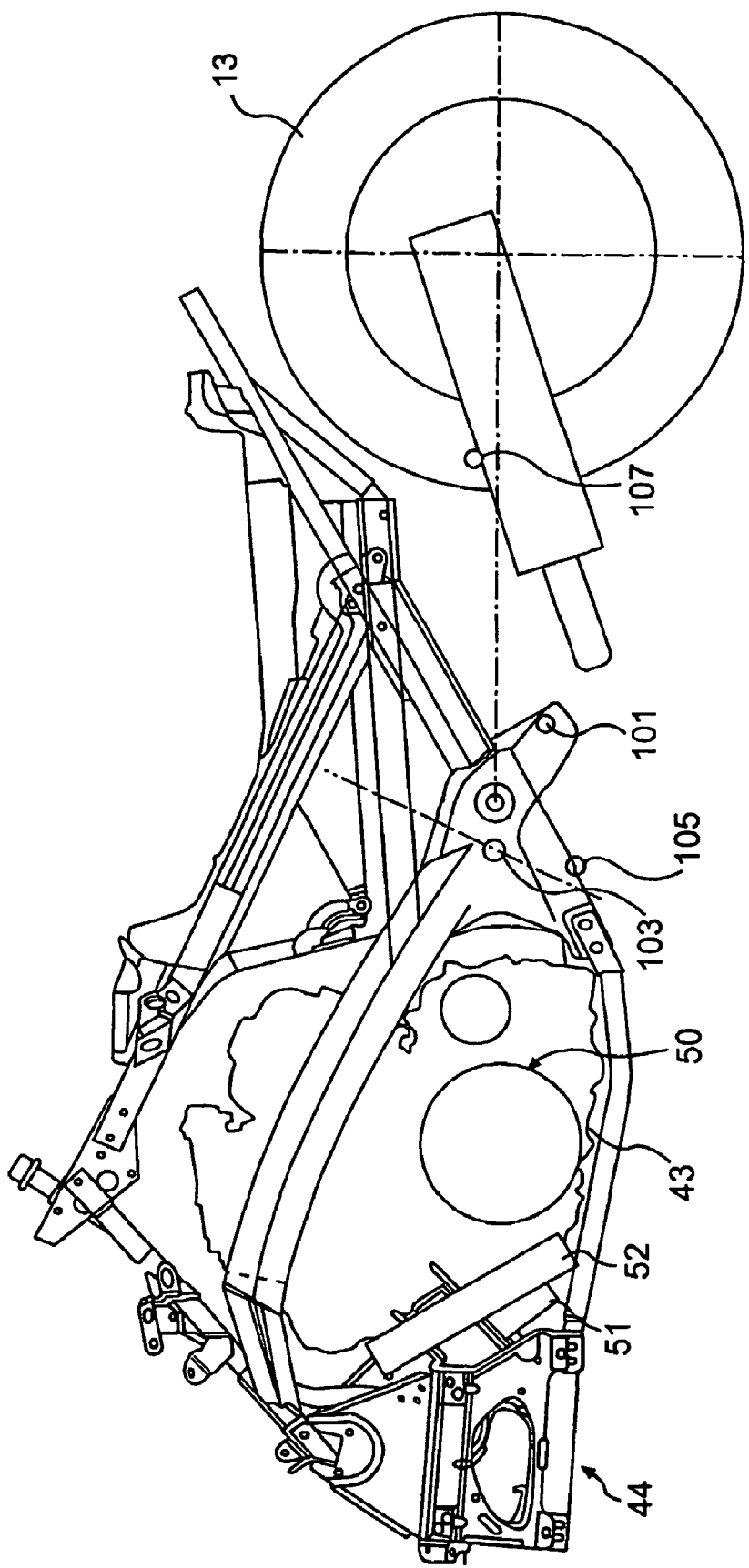
FIG. 5 is a partial schematic side view of the vehicle in accordance with the present invention illustrating the split radiator and cooling assembly.

Another improvement over the prior art vehicles is the use of an oil cooler assembly 51. The oil cooler assembly 51 is positioned adjacent the engine 50 in a lower front portion of the frame, as shown in FIG. 5. Air is directed onto the oil cooler assembly 51 for purposes of cooling the same. There is an opening 45 in a front subframe 44 of the vehicle, as shown in FIG. 4, through which air travels to an oil cooler assembly 51. The air is directed through the subframe 44 along the path indicated by the arrow in FIGS. 4 and 5. The air entering the opening may also be directed to the radiators 52 and 53 in the embodiment illustrated in FIG. 15 along the path indicated by the arrows in FIG. 15.

As illustrated in FIGS. 1-3, a fender assembly 60 is associated with each of the front wheels 11 and 12. As shown in FIGS. 1 and 2, each fender assembly 60 includes a cover assembly that covers the top rear portion of the tires. The fender assembly 60 prevents dirt, water and road debris from being kicked up onto the rider, while the rider operates the vehicle 10. Each fender assembly 60 is linked to the front suspension assembly 20 and a steering assembly 70 such that the fender assembly moves in connection with the wheels 11 and 12 during steering of the vehicle 10. This arrangement ensures that the tires will not kick up dirt, water and road debris as the vehicle 10 turns. The steering of the front wheels 11 and 12 is accomplished through the use of the steering assembly 70, which includes handlebars 71 and steering linkages (not shown) connected to the wheels 11 and 12.

The front of the vehicle 10 includes a fairing assembly 80, which encloses the engine 50 to protect it and to provide an external shell that can be decorated so that the vehicle is aesthetically pleasing. The fairing assembly 80 is preferably made from fiberglass having a gel coat or made from polymers. The fairing assembly 80 also protects the radiators 52 and 53. The fairing assembly 80 includes an upper portion 81, a hood 82 removably secured to the upper portion 81 and a bottom pan 83. The fairing assembly 80 is secured to the vehicle frame assembly 40 by a plurality of fairing anchors.

Figure 11:
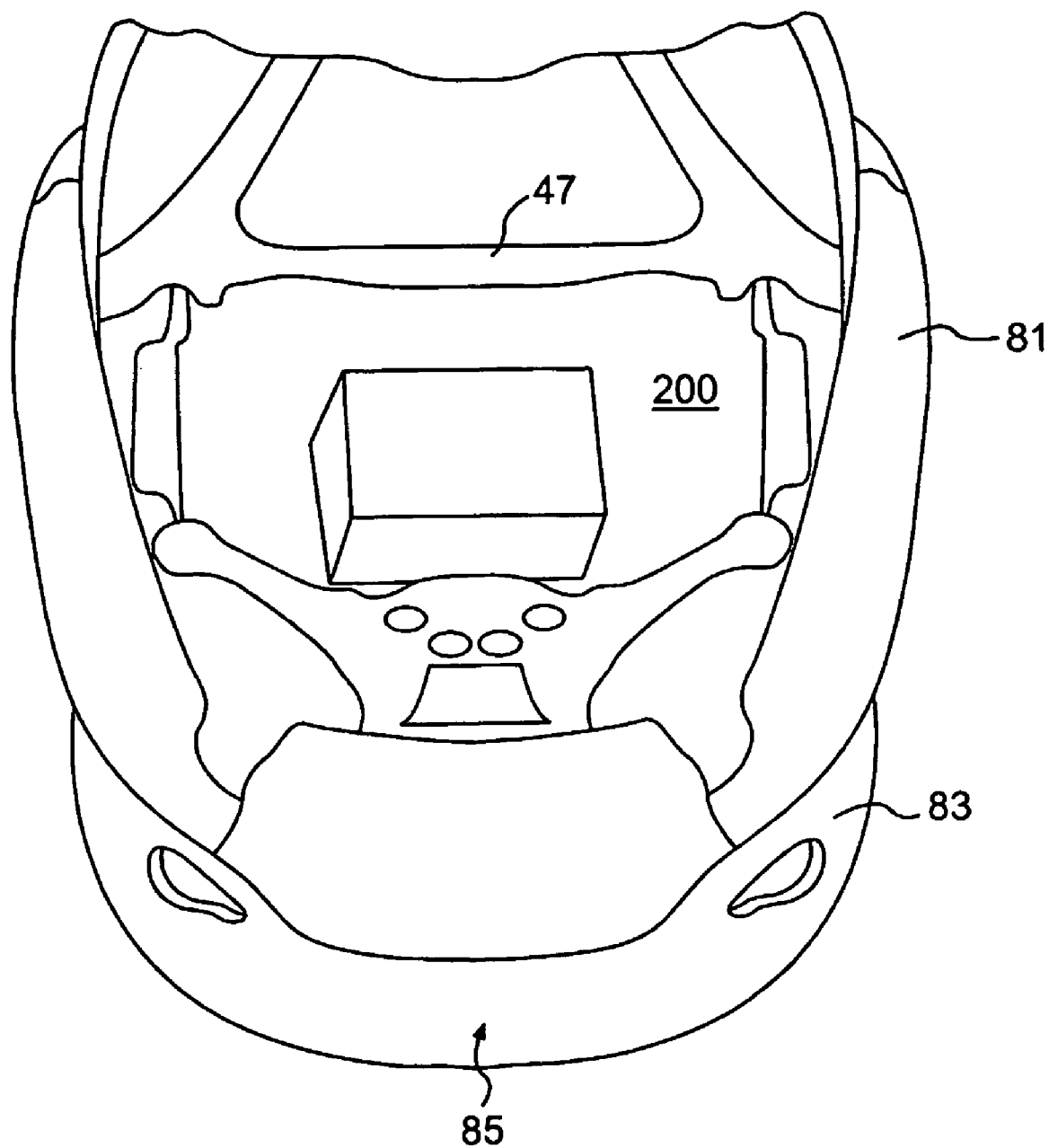
FIG. 11 is a left front perspective view of the storage compartment in the front portion of the fairing assembly.
Figure 12:
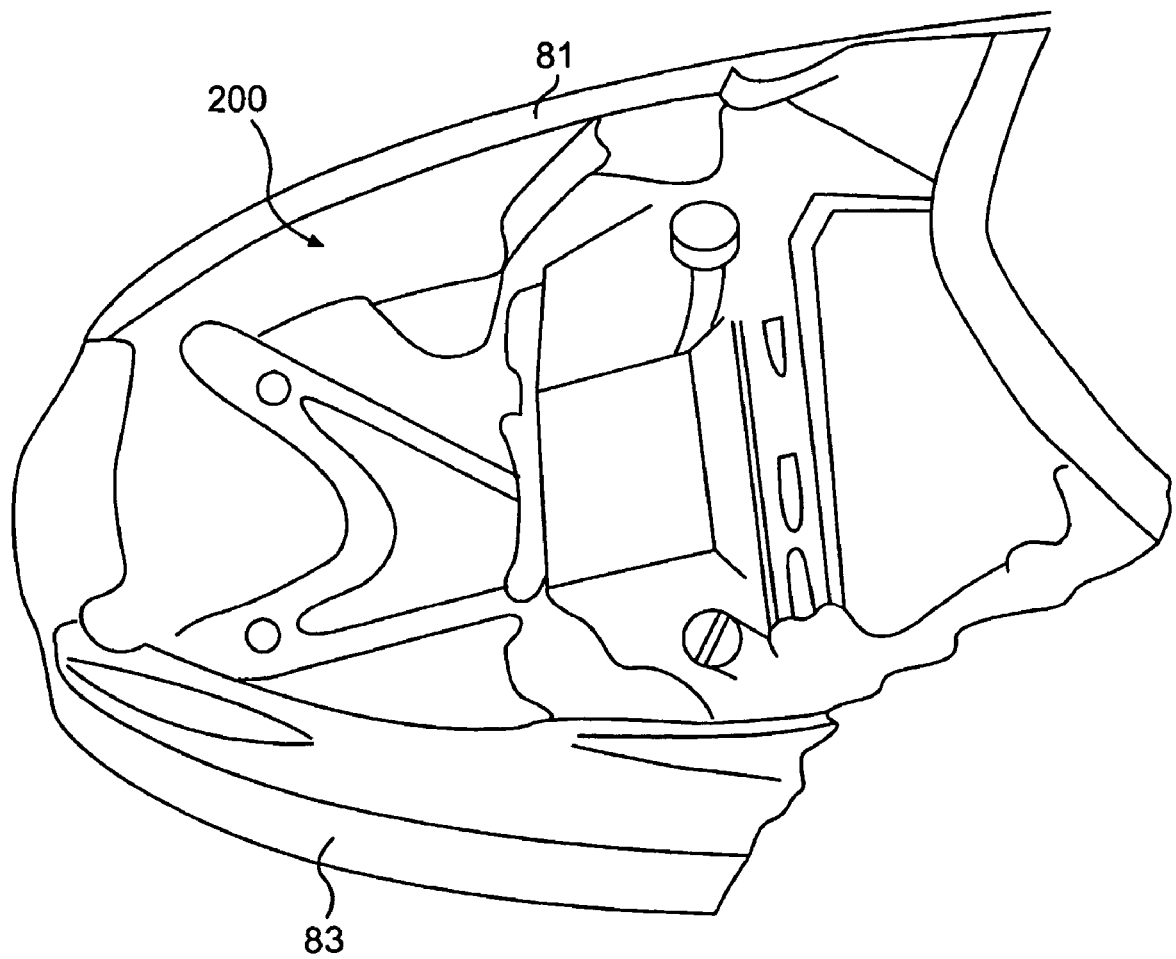
FIG. 12 is a front top view of the storage compartment in the front portion of the fairing assembly.

The hood 82 on the vehicle 10 is relatively flat when viewed from the side, as shown in FIG. 2. The hood 82 also extends almost the entire width of the vehicle body (excluding the wheels). As a result, air impacting the hood 82 is directed over the top of the vehicle rather than to the sides, which improves vehicle handling. The hood 82 includes at least one air intake opening 84 to provide a supply of air to an air box (not shown) for supplying air to the air intake of the engine 50. As previously mentioned, the hood 82 is removable to permit access to an interior storage compartment 200 located at the front portion of the vehicle 10, as illustrated in FIGS. 11 and 12. The space for the storage compartment 200 is created by the relocation of the radiator to the sides of the vehicle 10 using the first and second radiators 52. The storage compartment 200 offers the driver a place to store personal belongings when the vehicle 10 is parked in a public location. The storage compartment 200 is sized to receive at least one full sized helmet. The storage compartment 200 is sized to receive at least one full sized helmet. The storage compartment 200 may include a removable insert (not shown) having separate storage compartments formed therein. Access to the engine 40 and the engine service center is facilitated by removing the insert. The engine service center clusters the vehicle battery, oil reservoir, radiator coolant reservoir, fuse box, engine oil dipstick and related service components in a central location so that the components can be easily accessed and serviced. It is preferable that the hood 82 has a lock assembly (not shown) to limit access to the storage compartment 200 and prevent removal of items stored therein when the rider is not present.

The upper portion 81 of the fairing assembly 80 further includes a cluster of headlamps 811. A windshield 812 may be connected to the handlebars 71 or the upper portion 81 of the fairing assembly 80 near at the front section, as shown in FIG. 1.

Figure 8:
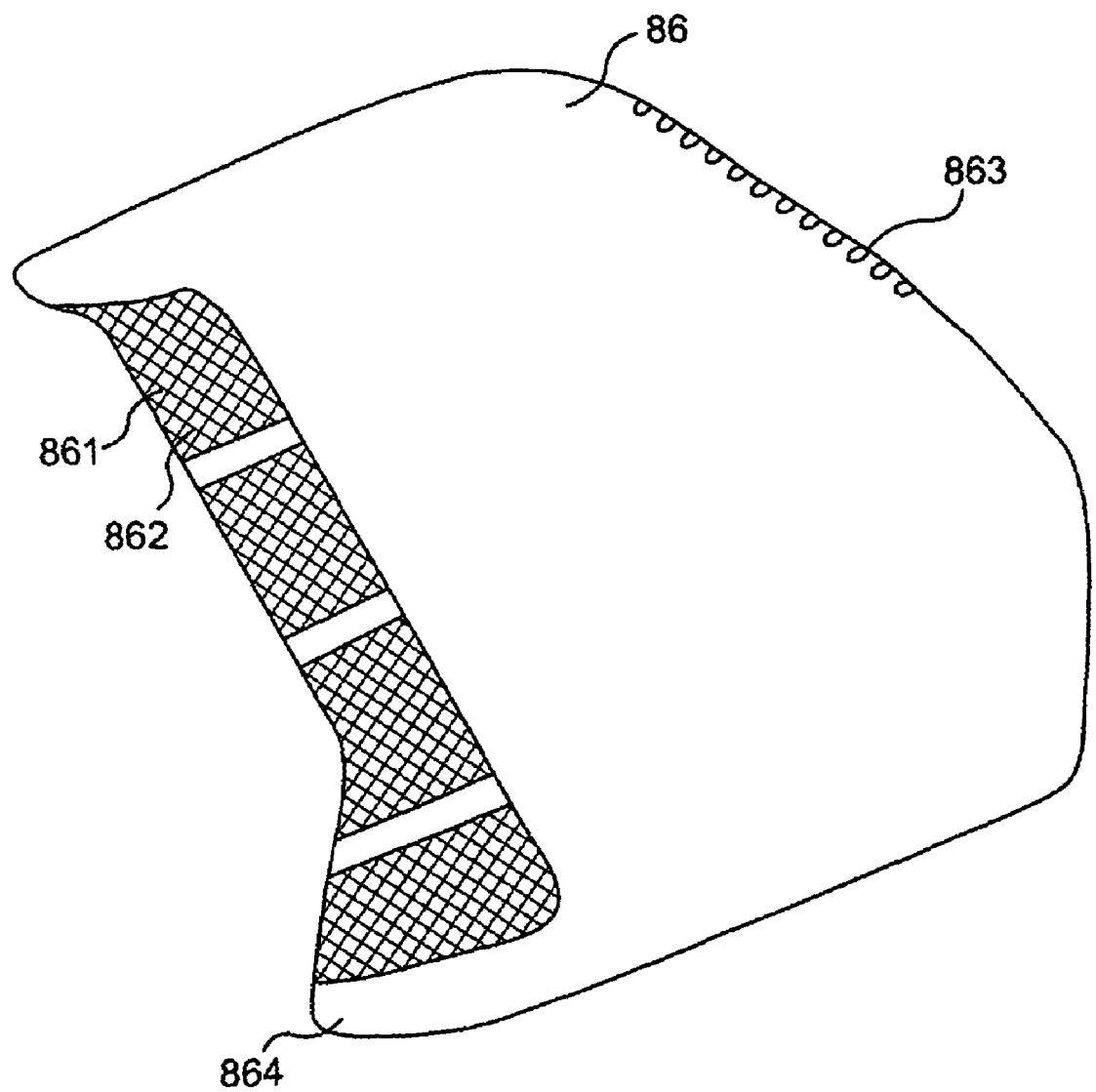
FIG. 8 is a side view of the radiator cover of the fairing assembly.
Figure 9:
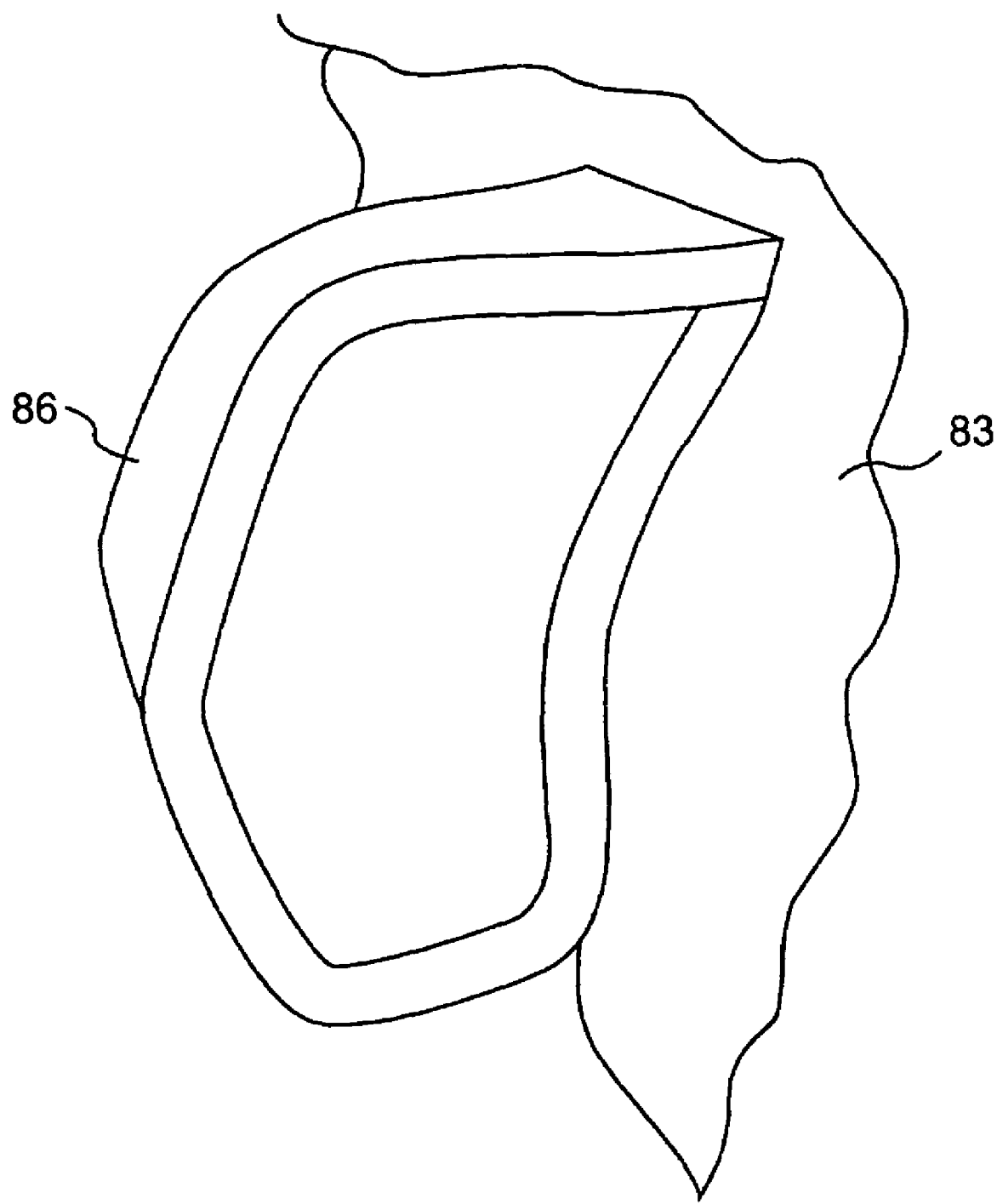
FIG. 9 is a front right perspective view of the radiator cover of the fairing assembly.

The bottom pan 83 includes an angled scoop 85 that directs air upwardly and rearwardly. This minimizes the amount of air traveling under the vehicle 10, which improves the overall vehicle handling. The bottom pan 83 of the fairing assembly 80 may also include one or more fog lamps 831. The bottom pan 83 includes a pair of lateral extensions, which form radiator covers 86. The radiator covers 86 illustrated in FIGS. 7-9 surround and protect a pair of laterally spaced radiator assemblies 52, which together form a radiator for the engine 50. As evident from FIG. 2, the rider's feet are positioned on foot pegs 101 and 102 to rear of the radiator covers 86. As such, the radiator covers 86 also function to provide a windbreak for the feet and lower legs of the driver. The radiator covers 86 may include an angled scoop formed on a lower portion thereof. Like the scoop 85, the angled scoop directs air upwardly and rearwardly over the radiator covers.

The radiator covers 86 are integrally formed of the same material as the bottom pan 83 of the fairing assembly 80. As shown in FIG. 7, the front side of the radiator cover 86 includes at least one opening 861 to permit the flow of air into the interior of the radiator cover 86 to cool the radiator of the radiator 52 located therein. The openings 861 are covered with a grill assembly 862 to prevent rocks and other debris from contacting and damaging the radiator 52. The rear outside of the radiator cover 86 may include one or more vents 863, which can be selectively operated by the rider. The vents 863 can be opened during cooler driving conditions to direct some warm air from the radiators onto the rider's feet and lower legs. The radiator covers 86 may include an angled scoop 864 that directs air upwardly and forwardly.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

The invention claimed is:

1. A three wheel vehicle, comprising:
   a frame having a front portion and a rear portion;
   a pair of front wheels rotatably connected to the front portion of the frame;
   a single rear wheel rotatably connected to the rear portion of the frame;
   a straddle type vehicle seat connected to the frame;
   a storage compartment disposed at the front portion of the frame between the pair of front wheels;
   an engine connected to the frame, the engine being disposed rearwardly of the storage compartment and at least in part rearwardly of the front wheels, wherein the engine provides power to drive at least one of the single rear wheel and the pair of front wheels;

a portion of the storage compartment preventing access to the engine via the storage compartment, and a radiator system for cooling the engine, wherein the radiator system includes a first radiator.

2. A three wheel vehicle according to claim 1, wherein the first radiator is located on one side of the frame and a second radiator is located on an opposite side of the frame.

3. The three wheel vehicle according to claim 1, wherein the storage compartment includes a cover to provide access to the storage compartment when the cover is at an open position.

4. The three wheel vehicle according to claim 1, wherein the portion of the storage compartment is a removable insert located within the storage compartment.

5. The three wheel vehicle according to claim 1, wherein the storage compartment provides access to an engine service center.

6. The three wheel vehicle according to claim 1, wherein the structure defining the storage compartment is a fairing assembly.

7. A three wheel vehicle according to claim 2, wherein the second radiator is spaced apart from and is fluidly connected to the first radiator.

8. The three wheel vehicle according to claim 2, wherein each of the first and second radiators is located rearwardly of the pair of front wheels.

9. The three wheel vehicle according to claim 2, wherein each of the first and second radiators is disposed at an angle with respect to a vertical axis of the vehicle.

10. The three wheel vehicle according to claim 2, wherein each of the first and second radiators is disposed at an angle with respect to a longitudinal axis of the vehicle.

11. The three wheel vehicle according to claim 2, wherein each of the first and second radiators is disposed substantially parallel to a longitudinal axis of the vehicle.

12. The three wheel vehicle according to claim 2, wherein at least one of the first radiator and the second radiator includes a fan assembly for directing air through the at least one of the first radiator and the second radiator.

13. The three wheel vehicle according to claim 2, further comprising a fairing assembly enclosing at least the front portion of the frame, the fairing assembly including a first radiator enclosure for enclosing at least a portion of the first radiator and a second radiator enclosure for enclosing at least a portion of the second radiator.

14. The three wheel vehicle according to claim 2, wherein the storage compartment is positioned between the first radiator and the second radiator.

15. The three wheel vehicle according to claim 12, wherein each fan assembly is arranged to direct a flow of air towards a centerline of the vehicle, whereby the flow of air flushes hot air away from the engine.

16. The three wheel vehicle according to claim 13, wherein at least one of the first radiator enclosure and the second radiator enclosure includes a venting assembly for selectively venting air from at least one of the first and second radiator enclosures, the venting assembly being movable between an open position in which air from at least one of the first and second radiator enclosures is directed onto the rider and a closed position.

17. A straddle type three wheel vehicle, comprising:
a tubular frame having a front portion and a rear portion, the tubular frame having a head pipeless construction;
a pair of front wheels rotatably connected to the front portion of the frame;
a single rear wheel rotatably connected to the rear portion of the frame, each of the pair of front wheels and the single rear wheel including a tire suitable for road use;
handlebars operatively rotatably connected to the frame and operatively connected to the front wheels to steer the vehicle;
a straddle vehicle seat connected to the frame, the seat being sized to accommodate at least two riders;
a storage compartment supported by the frame disposed between the pair of front wheels in front of the handlebar, the storage compartment having a cover;
an engine connected to the frame, the engine providing power to drive at least one of the single rear wheel and the pair of front wheels, the engine being disposed rearwardly of the storage compartment and at least in part rearwardly of the front wheels;
a portion of the storage compartment preventing access to the engine via the storage compartment; and
a vehicle suspension system operatively connected to at least one of the pair of front wheels and the single rear wheel.

18. The three wheel vehicle according to claim 17, further comprising a radiator system for cooling the engine, the radiator system including a first radiator and a second radiator.

19. The three wheel vehicle according to claim 17, wherein the tire suitable for road use is a tire having a pressure of between 138 kPa [20 psi] and 345 kPa [50 psi].

20. The three wheel vehicle according to claim 18, wherein the first radiator is located on one side of the frame and the second radiator is located on an opposite side of the frame.

* * * * *